April 18, 1961

W. T. RENTSCHLER 2,979,999

PHOTOGRAPHIC INTRA-LENS SHUTTER WITH A DELAYED ACTION
DEVICE AND CONTACT ARRANGEMENT FOR FLASH RELEASE

Filed April 6, 1955

INVENTOR
Waldemar T. Rentschler

BY
Munn, Liddy, Nathanson & March
ATTORNEYS

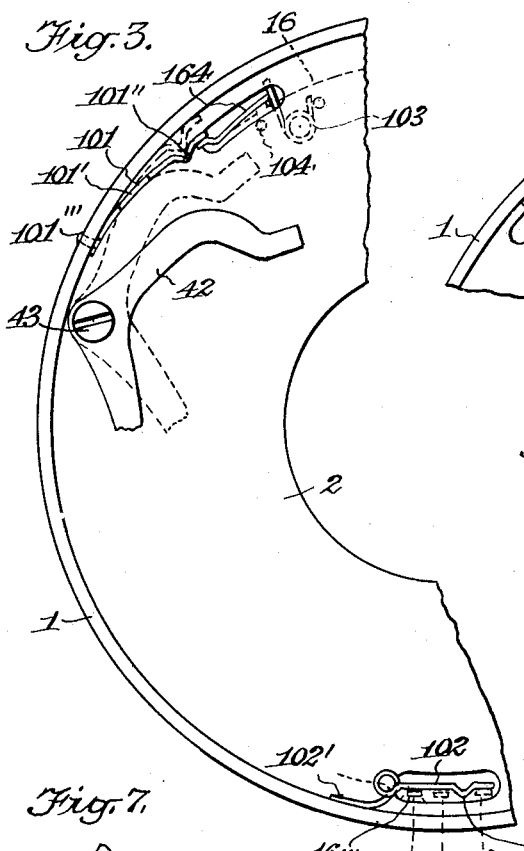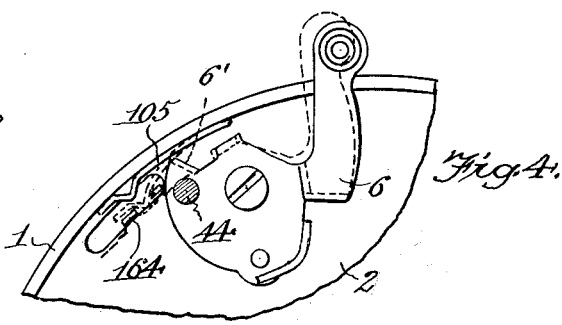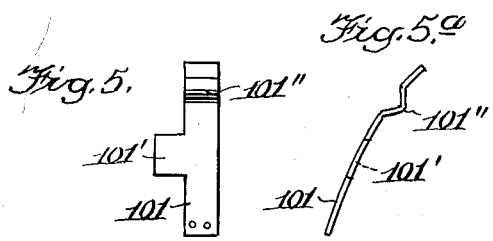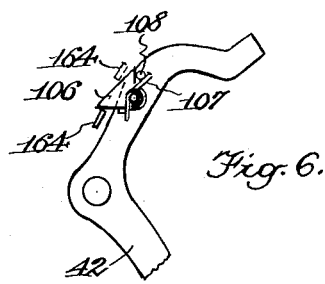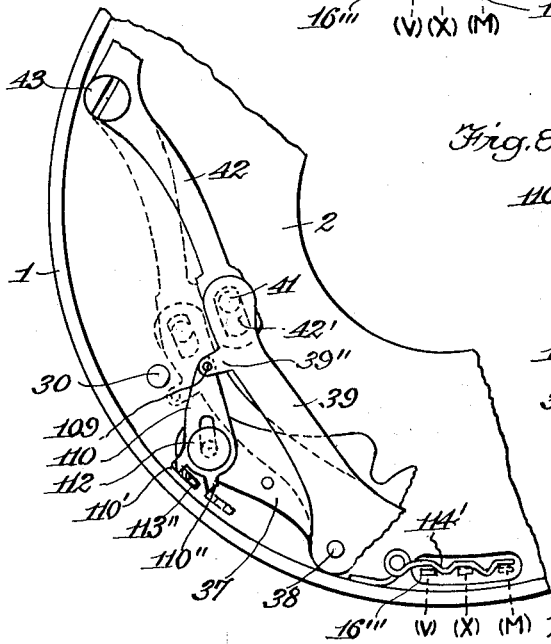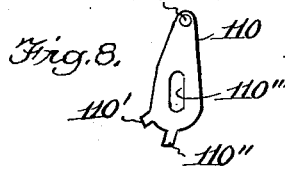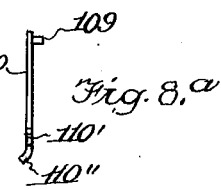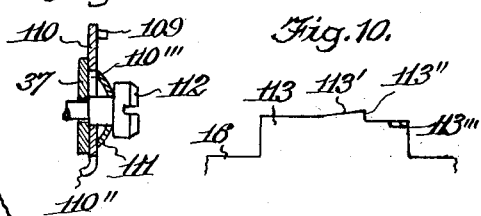

United States Patent Office 2,979,999
Patented Apr. 18, 1961

2,979,999

PHOTOGRAPHIC INTRA-LENS SHUTTER WITH A DELAYED ACTION DEVICE AND CONTACT ARRANGEMENT FOR FLASH RELEASE

Waldemar Traugott Rentschler, Calmbach (Enz), Germany, assignor to Alfred Gauthier G.m.b.H., Calmbach (Enz), Germany, a corporation of Germany Filed Apr. 6, 1955, Ser. No. 499,735

Claims priority, application Germany May 3, 1954

14 Claims. (Cl. 95—11.5)

This invention relates to a photographic intra-lens shutter with a delayed action device and a contact arrangement for flash release, and has especial reference to an exposure selector and controller for a shutter of the indicated character.

The type of shutter to which the present invention is applied is disclosed in my pending application, Serial No. 467,096, filed November 5, 1954, now Patent No. 2,901,953. The manner of cocking this type of shutter, and the settings and function of the exposure selector, including the "V," "X" and "M" settings, are described in detail in this copending application and details thereof form no part, per se, of the present invention. Such shutter includes a settable controlling ring which may be adjusted to obtain different exposures, namely, delayed action exposures, denoted by a marking "V"; normal exposures as well as electronic flash exposures and exposures with flash lamps at comparatively slow speeds up to 1/25 of a second, denoted by a marking "X"; and flash bulb gun exposures with high speeds, denoted by the marking "M."

The principal object of the present invention is to incorporate in a shutter of the indicated character means which cooperates with the settable controlling ring without materially altering the shutter and which utilizes a part or parts already in the shutter to thereby improve the efficiency and convenience in handling the shutter, and to do so at low cost.

In accordance with the foregoing object, after an effected "V" exposure by the appropriate adjustment of the settable controlling ring, the device of the present invention automatically returns said ring to the exposure position "X" only after the shutter blade ring is free and not later than when the cocking of the shutter for the next exposure has been performed, because of the fact that the delayed action device is disconnected when said ring moves out of the "V" position but continues to operate idly for security reasons after the shutter blade operating ring is free. This enables the use of a movable part or parts of the existing shutter system to release the settable controlling ring for its automatic return to the normal position "X."

Other advantages of the present invention are as follows. When the shutter is cocked each undertaken exposure adjustment can be cancelled or repeated at will. This is particularly desirable with regard to the use of the delayed action device which may be kept idle even when the shutter is cocked. A photographer can freely change from one exposure adjustment to another to meet all situations until the moment of the release of the shutter and without making undesired exposures and the concomitant waste of film. Also a locking means may be attached to the settable controlling ring to make it impossible to adjust said ring to the "V" position when the shutter is uncocked.

The accompanying drawings illustrate some embodiments of the invention, in which Fig. 1 is a front view of the shutter equipped with the present invention, the covering ring and speed setting ring having been removed, the delayed action device and flash synchronizer mechanism being illustrated only schematically, and the shutter being uncocked.

Fig. 3 is a fragmentary front view of the shutter housing and one embodiment of the present invention arranged therein, certain parts having been omitted for the sake of clearness.

Fig. 4 is a front view showing a further embodiment of the invention.

Fig. 5 is a plan view of a blade spring employed as a part of the embodiment shown in Fig. 3.

Fig. 5a is a side view of the spring shown in Fig. 5.

Fig. 6 illustrates a device for preventing the movement of the settable controlling ring into the "V" position.

Fig. 7 is a view like Fig. 3 but showing a further embodiment of the invention.

Fig. 8 is a plan view of the actuating member of the embodiment shown in Fig. 7.

Fig. 8a is a side view of the actuating member shown in Fig. 8.

Fig. 9 is a fragmentary sectional view showing certain features of the embodiment shown in Fig. 7.

Fig. 10 is an enlarged view of one of the arms of the settable controlling ring in the embodiment shown in Fig. 7.

Figure 1:
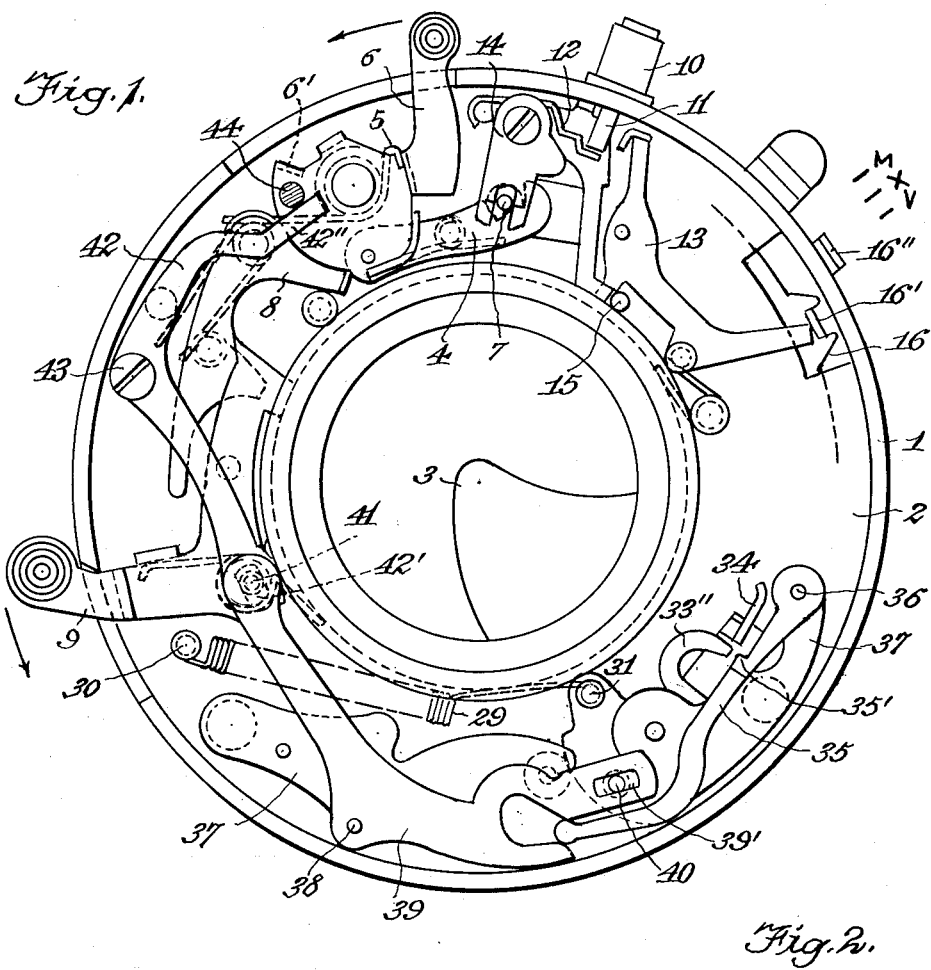

In the drawings there is shown a shutter housing 1 on the inside of which is arranged a base plate 2. One of the shutter blades is designated 3. The reciprocatory ring which operates the blades is not fully shown. The drive of the shutter blade operating ring is derived by means of a link 4 connected with a cocking lever 6 biased by a spring 5. The link 4 has a notch which receives a pin 7 fixed on the shutter blade operating ring. The cocking lever 6 which is fulcrumed on the plate 2 is held in a cocked position by a lever 8 which is engageable with a release lever 9 to be operated by the latter. In order to electrically connect and operate flash guns the shutter is equipped with a plug device 10 whose insulated pin 11 is engageable with a contact spring 12 and a lever 13 mounted on the plate 2. For actuating the contact spring 12 there is provided a lever 14 fulcrumed on the plate 2, said lever 14 being engageable with the spring 12 for closing an electric circuit through the pin 11 at the moment when the shutter aperture is fully open, whereby the pin 7 engages the lever 14, while the lever 13 engages the pin 11 after a small angular movement of the shutter blade operating ring, wherein the pin 15 on said ring acting on the lever 13 frees the latter. It is to be understood that the circuit closing operation occurs only when the lever 13 is not held inactive by the arm 16' on a settable flash selector and control ring 16 supported for direct and return rotational movement on the housing 1. The lever 13 is in an active position when the index 16" of the ring 16 points to the mark "M." When the index 16" is adjusted to the mark "X" or "V" the lever 13 is held inactive.

Figure 2:
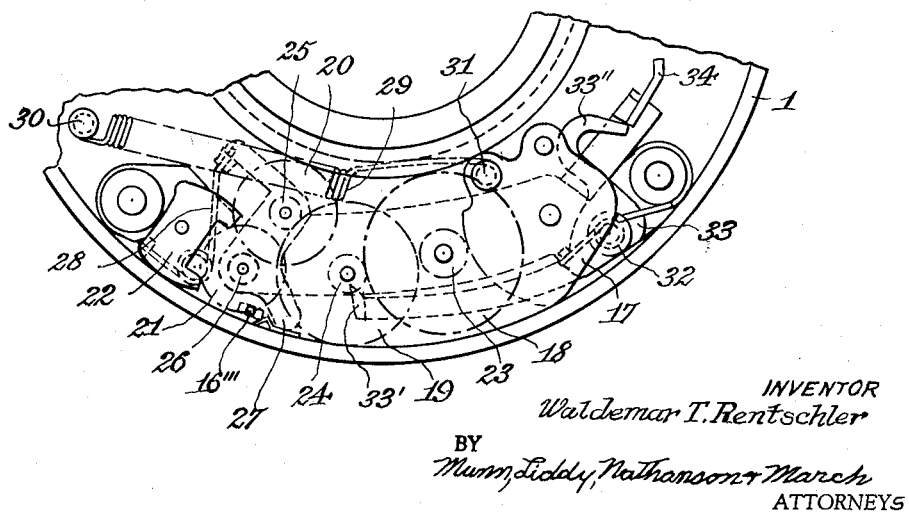
Fig. 2 is a fragmentary front view of the delayed action device and synchronizer mechanism uncocked while the settable controlling ring is adjusted to the "V" position.

The delayed action device shown in Fig. 2 comprises a toothed segment 17, gear wheels 18, 19 and 20, a balance wheel 21, a balance 22, and pinions 23, 24, 25 and 26. The gear wheel 20, pinions 25 and 26, balance wheel 21, and the balance 22 are mounted on a bridge 27 swingable around on the arbor of the balance wheel 21. A spring 28 biases the bridge 27 in a clockwise direction. The delayed action device is driven by means of a helical spring 29 which has one end thereof connected with a pin 30 on the plate 2 and its other end is connected with a pin 31 on the segment 17. For locking the delayed action device, use is made of a spring pressed two-armed lever 33 fulcrumed at 32, said lever 33 having a projection 33' on one of its arms, and the projection 33' being engageable with and disengageable from the pinion 24.

The release of the delayed action device is accomplished by an arm 34 on the shutter blade operating ring, said arm 34 encountering the end 33" of the second arm of the lever 33, thereby turning the latter anticlockwise and so causing the projection 33' to become disengaged from the pinion 24 and enabling the delayed action device to run down. The release of the delayed action device occurs after a slight angular movement of the shutter blade operating ring during which the shutter blades remain closed owing to the overlap of the blades when closed. In the interval between the start of the movement of the shutter blade operating ring and the release of the delayed action device by means of the arm 34, a flash circuit closing operation is effected by means of the lever 13.

For arresting the shutter blade operating ring, there is provided a lever 35 fulcrumed as at 36 on a bearing plate 37 of the delayed action device. The lever 35 has a nose 35' which confronts the arm 34 and prevents said ring from having clockwise movement beyond a predetermined distance.

In order to release the shutter blade operating ring the lever 35 is actuated by a two-armed lever 39 fulcrumed at 38 on the plate 37. A pin 40 fixed on the segment 17 engages in a slot 39' in the lever 39. Therefore when the delayed action device runs down, the lever 39 is moved clockwise to the position shown in Fig. 1, thus moving with it the lever 35 counterclockwise to the shown position in Fig. 1 and so disengaging the nose 35' of the lever 35 from the arm 34, thus allowing said shutter blade operating ring to effect the shutter blade operation.

Cooperating with the cocking lever 6 and the lever 39 is a lever 42 fulcrumed at 43 on the plate 2. A pin 41 on the second arm of the lever 39 engages in a slot 42' in the lever 42. A beveled pin 44 on the lever 6 acts on the arm 42" of the lever 42 as the lever 6 is manipulated anticlockwise thereby causing the lever 42 to move clockwise, and through the intervention of the pin 41 the lever 42 causes the lever 39 to move anticlockwise. Thus the parts 40, 39, 41, 42, 44 and 6 function to cock the shutter and the delayed action device simultaneously.

The ring 16 has rotatory movement into different set positions, namely, an initial normal position and manually set positions to obtain self-exposures and exposures with and without the presence of light from flash producing means. The initial normal position of the ring 16 is indicated by the mark "X" and the manually set positions are indicated respectively by the marks "V" and "M." In accordance with the present invention, the ring 16 is automatically returned from the position "V" to the position "X" by means operatively arranged in the shutter housing 1 and presently to be described.

In Fig. 3 the ring 16 is shown as having an arm 164. A yieldable lock in the form of a blade spring 101 is employed to cooperate with said arm 164. The spring 101 has a transverse crimp which provides a projection 101" near one end thereof, and the other end is secured as at 101''' to the housing 1 so that the spring is disposed on the inside of the housing and is capable of being flexed upwardly from a normally down active position. The spring 101 also has a lateral arm 101' thereon between the projection 101" and the securing means 101'''. In the "V" position of the ring 16 the arm 164 engages the free end of the spring 101 and is arrested by the projection 101". A coiled spring 103 is mounted on the plate 2 and acts on the arm 164 to constantly urge the ring 16 in an anticlockwise direction. In spaced relation to the spring 101 is a wire spring 102 which has one end thereof secured to the housing 1, as at 102'. The spring 102 is crimped to provide a projection 102". An arm 16''' on the ring 16 cooperates with the spring 102 to secure the ring in the positions "X" and "M," and also to prevent clockwise movement of the ring 16 beyond the "V" position. The spring 101, arm 164, spring 102 and the arm 16''' are arranged and cooperate so that the securement of the ring 16 in the "V" position is assured, and enables the arm 16''' to move with respect to the spring 102 without being biased by said spring, when the ring 16 is being moved from the position "X" into the position "V."

After the actuation of the shutter release lever 9, the delayed action device is activated. Then the arm 34 on the shutter blade operating ring is disengaged from the nose 35' of the lever 35, and as a consequence the shutter is opened for the purpose of an exposure. At the moment when the arm 34 is disengaged, the delayed action device continues to run down idly and causes a corresponding anticlockwise turning movement of the two-armed lever 42. This movement of the lever 42 no longer influences the shutter blade operation, but causes the lever 42 to act on the arm 101' of the spring 101, thereby flexing the spring 101 upwardly into the position shown in dotted lines in Fig. 3, with the result that the arm 164 is free from the spring 101. Then under the action of the spring 103 the ring 16 is returned to the position "X," wherein one leg of the spring 103 encounters a pin 104 under the plate 2, and so prevents any influence of the spring 103 on the spring 102 by the arm 16'''.

In Fig. 4 a spring 105 substantially similar to the spring 101 is employed in combination with the cocking lever 6 and the arm 164 on the ring 16. The lever 6 is shown in dotted lines in its position just at the moment when the shutter aperture is closed, and is shown in full lines in its normal position. As before stated, the shutter blades 3 overlap each other which enables the shutter blade operating ring to have a certain amount of angular movement without opening the shutter aperture and also in closing said aperture, there being no adverse effect so far as the attainment of the desired exposure.

The embodiment of the invention shown in Fig. 4 operates as follows. When the ring 16 is set at the position "V," the ring 16 is arrested by the arm 164 engaging the spring 105. When the lever 6 reaches the end of its run down movement, an arm 6' acts on the spring 105 thereby releasing the ring 16 from its "V" position for movement into its "X" position by the spring 103.

The choice of the embodiments of Figs. 3 and 4 is dependent upon the characteristics of the shutter regarding available space. The size of the drive spring 29 of the delayed action device is also to be taken into consideration. If the spring 29 is very weak, it is desirable not to rely upon this spring to release the spring 101 or the spring 105, but it is advantageous to release said springs by means of the shutter drive mechanism with the embodiment shown in Fig. 4. Also it is within the invention to utilize suitable parts, such as the lever 42, already available in the shutter organization without alteration of said parts, thereby achieving an economic advantage.

To prevent unintentional movement of the ring 16 into the "V" position while the shutter is uncocked, use is made of a spring actuated latch 106 on the lever 42 shown in Fig. 6. The spring 107 of the latch 106 influences the latter in a clockwise direction to engage a stop 108 on the lever 42. Therefore, when the ring 16 is moved from its position "V" into the position "X," the arm 164 moves from the position shown in dotted lines into the position shown in full lines. Consequently, the ring 16 cannot be adjusted to the position "V" while the shutter is uncocked. This of course is only possible when the lever 42 is in the position shown in full lines in Fig. 3.

Additional embodiments of the invention are shown in Figs. 7 to 10 for automatically returning the ring 16 from the position "V" into its normal position "X." These embodiments are recommended when the friction rate of the ring 16 and the use of a small drive means such as the spring 103 present deficiencies against unfailing return movement of the ring 16. To overcome the mentioned deficiencies and to assure the return movement of the ring 16, use is made of the lever 39 already available as a part of the shutter organization for simultaneously cocking the shutter, the delayed action device and the flash synchronizer mechanism. The lever 39 has a small arm 39″ which is pivotally connected by a pin 109 with one end of an actuating member 110 in the form of an oblong plate. The member 110 is supported on the bearing plate 37 by means of a cap screw 112 extending through a slot 110‴ and in threaded engagement with the plate 37. The member 110 has spaced projections 110′ and 110″ on the end remote from its pivoted end, as shown most clearly in Figs. 8 and 8a. A weak spring washer 111 is interposed between the member 110 and the head of the screw 112. The member 110 may be shifted in a substantially vertical direction to slide while it pivots. An arm 113 on the ring 16 is interposed between the projections 110′ and 110″. The arm 113 has a sloped face 113′ and spaced shoulders 113″ and 113‴.

The operation of the device shown in Fig. 7 is as follows. After an effected delayed action exposure the parts assume the relation shown in full lines. The ring 16 moved into the position "V" is arrested therein by the engagement of the arm 16‴ with the bent portion 114′ of the spring 114 which constitutes a yieldable lock. During the running down of the delayed action device the lever 39 operates the member 110 causing the projection 110′ to ride on the sloped face 113′. This is possible by reason of the use of the washer 111. At the end of the run down of the delayed action device the member 110 has reached a position in which the projection 110′ falls behind the shoulder 113″. When cocking the shutter the levers 42 and 39 assume the positions respectively shown in dotted lines in Fig. 7. In the movement of the lever 39 the member 110 is given a compound pivoting and sliding movement thereby causing the projection 110′ acting on the shoulder 113″ to move the ring 16 from the position "V" into the position "X." The arm 113 reaches the position shown in dotted lines in Fig. 7 at the time the shutter is cocked. When the shutter is uncocked and the arm 113 is in the position "X" between bent portions of the spring 114, the ring 16 cannot be accidentally moved from the position "X" into the position "V" because the projection 110′ is obstructed by the shoulder 113‴. Movement of the ring 16 from the "X" position into the "V" position may be accomplished only when the shutter is cocked. The embodiment of the invention of Fig. 7 like that of Fig. 3 affords the advantages of maximum freedom for making and cancelling all exposure settings while the shutter is cocked and eliminates inadvertent delayed action exposures because the delayed action device is always disengaged automatically after making an exposure therewith.

I claim:

1. A photographic intra-lens shutter having a delayed action device; a contact arrangement for a flash release; a synchronizer mechanism constituting a part of said delayed action device for self-exposures; a shutter drive means; means connected with said mechanism and shutter drive means and including one manually operable part for cocking said mechanism simultaneously with the cocking of the shutter drive means in response to manual actuation of solely said one operable part; a shutter housing; a delayed-action setting ring controlling said delayed action device and arranged on said housing, said ring being movable for effecting "V," and "X" exposures; a control device arranged on said housing, said device being operable to return said ring from its "V" position into its "X" position; a yieldable lock for holding the ring in said "V" position, said lock being yieldable for releasing the ring independently of cocked or released positions of the shutter; manually operable means for actuating the setting ring between "V" and "X" positions, said means being adapted to overcome said yieldable lock, said control device being separate from said manually operable means; and actuator means separate from the manually operable means, for automatically rendering said control device operative after the delay movement of the delayed-action device has taken place, thereby to cause said device to shift the said ring to its "X" position.

2. A photographic intra-lens shutter according to claim 1 wherein said control device includes a drive spring for said ring, wherein said lock comprises a resilient member on said housing, and wherein the actuator means includes means connected with said delayed action device to operate said resilient member to release said ring after the opening of the shutter.

3. A photographic intra-lens shutter according to claim 2, wherein said last mentioned means consists of a member which constitutes a constituent of said delayed action device.

4. A photographic intra-lens shutter according to claim 3, wherein said constituent member of the delayed action device has means engageable with said cocking means, which is operative in the simultaneous cocking of the shutter drive means and the delayed action device and synchronizer mechanism.

5. A photographic intra-lens shutter according to claim 1, wherein said control device includes a drive spring for said ring, and wherein the yieldable lock comprises a resilient member on said housing operable by the actuator means to release said ring for the said return thereof upon the completion of an exposure.

6. A photographic intra-lens shutter having a delayed action device; a contact arrangement for a flash release; a synchronizer mechanism constituting a part of said delayed action device for self-exposures; means for cocking said mechanism simultaneously with the cocking of the shutter; a shutter housing; a delayed-action setting ring controlling said delayed action device and arranged on said housing, said ring being movable for effecting "V" and "X" exposures; a control device arranged on said housing, said device being operable to return said ring from its "V" position into its "X" position; a yieldable lock for holding the ring in said "V" position, said lock being yieldable for releasing the ring independently of cocked or released positions of the shutter; manually operable means for actuating the setting ring between "V" and "X" positions, said means being adapted to overcome said yieldable lock, said control device being separate from said manually operable means; and actuator means separate from the manually operable means, for automatically rendering said control device operative after the delay movement of the delayed-action device has taken place, thereby to cause said device to shift the said ring to its "X" position, said control device including a drive spring for said ring, said yieldable lock comprising a resilient member on the housing, and the said actuator means including a drive member of the shutter, acting on the said resilient member to release the ring for the return thereof upon the completion of an exposure.

7. A photographic intra-lens shutter having a delayed action device; a contact arrangement for a flash release; a synchronizer mechanism constituting a part of said delayed action device for self-exposures; means for cocking said mechanism simultaneously with the cocking of the shutter; a shutter housing; a delayed-action setting ring controlling said delayed action device and arranged on said housing, said ring being movable for effecting "V" and "X" exposures; a control device arranged on said housing, said device being operable to return said ring from its "V" position into its "X" position; a yieldable lock for holding the ring in said "V" position, said lock being yieldable for releasing the ring independently of cocked or released positions of the shutter; manually operable means for actuating the setting ring between "V" and "X" positions, said means being adapted to overcome said yieldable lock, said control device being separate from said manually operable means; and actuator means separate from the manually operable means, for automatically rendering said control device operative after the delay movement of the delayed-action device has taken place, thereby to cause said device to shift the said ring to its "X" position, said control device including a member moved by cocking of the shutter and engageable with means on said ring to shift and release the ring for the said return thereof during the cocking operation.

8. A photographic intra-lens shutter according to claim 1, wherein said actuator means includes a member of the shutter system for simultaneously cocking the shutter drive means and the delayed action device and synchronizer mechanism.

9. A photographic intra-lens shutter according to claim 1, wherein said actuator means includes a member of the shutter system for simultaneously cocking the shutter drive means and the delayed action device and synchronizer mechanism, and means connected with said member which cooperates with means on said ring to effect the return movement of the ring.

10. A photographic intra-lens shutter according to claim 1, and a locking device which prevents the adjustment of said ring to the "V" setting when the shutter is uncocked.

11. In a camera shutter, a shutter housing, an adjustable ring adapted to have two different settings, said ring being disposed inside of said housing and having a return movement into a predetermined one of said settings from the other setting, said ring having an arm; detent means including a blade spring having a base portion affixed in said housing, said blade spring having a movable portion which cooperates with said arm for releasably retaining said ring in the said other setting; a drive spring on said housing action on said arm for causing said return movement of the ring; and a lever pivotally mounted in the shutter housing and having means engaging said blade spring, said lever being operable to shift the spring away from the arm and thus release said detent means, thereby to release the ring for the return movement of the latter under the action of the drive spring, said ring being shiftable between its two settings independently of said lever, by applying to the ring a force sufficient to overcome the detent force of the blade spring.

12. In a camera shutter a shutter housing, an adjustable ring adapted to have two different settings, said ring being disposed inside of said housing and having a return movement into a predetermined one of said settings from the other setting, said ring having an arm, a lever fulcrumed in said housing, and positive drive means movably carried by the housing and movable with respect thereto, said drive means being connected with said lever and cooperating with means on said arm for effecting a positive return movement of said ring into the said other setting.

13. In a shutter of the character described according to claim 12, wherein said drive means connected with said lever consists of an actuating member, means pivotally and slidably mounting the member on the housing, and spring means frictionally holding the member against free movement.

14. In a camera shutter, a shutter housing, an adjustable ring adapted to have two different settings, said ring being dipsosed inside of said housing and having a return movement into a predetermined one of said settings from the other setting, said ring having an arm, a lever fulcrumed in said housing, an actuating member, means pivotally connecting one end of said actuating member to said lever, a pivot secured in said housing and said pivot having a head, said actuating member having a slot therein through which said pivot extends, a projection on said actuating member, a spring washer between the head of said pivot and the actuating member and resiliently bearing on the latter, and said arm having a sloping face which terminates in a shoulder with which said projection coacts for causing the return movement of said ring by the operation of said lever.

References Cited in the file of this patent

UNITED STATES PATENTS

| | | |
|---|---|---|
| 1,645,929 | Riddell | Oct. 18, 1927 |
| 2,663,233 | Rentschler | Dec. 22, 1953 |
| 2,831,411 | Gebele | Apr. 22, 1958 |

FOREIGN PATENTS

| | | |
|---|---|---|
| 1,094,900 | France | Dec. 15, 1954 |